(12) United States Patent
Bishop et al.

(10) Patent No.: US 12,452,311 B2
(45) Date of Patent: Oct. 21, 2025

(54) ARTIFICIAL INTELLIGENCE BASED REAL-TIME SECURITY ESCROW SYSTEM

(71) Applicant: Bank of America Corporation, Charlotte, NC (US)

(72) Inventors: Jack Bishop, Evanston, IL (US); Betsy Balgooyen Keller, Chicago, IL (US); Luqman Sharief, Libertyville, IL (US); Basil C. Doyle, Chicago, IL (US); Yasir Pervaiz, Lombard, IL (US); Camilla Solideo, Chicago, IL (US); Caroline Farris, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 144 days.

(21) Appl. No.: 18/531,292

(22) Filed: Dec. 6, 2023

(65) Prior Publication Data

US 2025/0193241 A1    Jun. 12, 2025

(51) Int. Cl.
| | |
|---|---|
| *H04L 9/40* | (2022.01) |
| *G06F 21/62* | (2013.01) |
| *G06N 20/00* | (2019.01) |
| *H04L 41/16* | (2022.01) |

(52) U.S. Cl.
CPC .......... *H04L 63/20* (2013.01); *G06F 21/6218* (2013.01); *G06N 20/00* (2019.01); *H04L 41/16* (2013.01); *H04L 63/102* (2013.01); *H04L 63/1416* (2013.01)

(58) Field of Classification Search
CPC ... H04L 63/1416; H04L 63/20; H04L 63/205; G06N 20/00; G06N 3/044; G06N 5/01; G06N 5/046; G06N 5/04; G06N 5/045; G06F 21/57; G06F 21/572; G06F 21/6218; G06F 21/6245
See application file for complete search history.

(56) References Cited

U.S. PATENT DOCUMENTS

| | | |
|---|---|---|
| 7,516,475 B1 | 4/2009 | Chen et al. |
| 9,088,543 B2 | 7/2015 | Lemke et al. |
| 9,531,757 B2 | 12/2016 | Henry et al. |
| 11,153,348 B2 | 10/2021 | Didomenico et al. |
| 11,991,210 B2 * | 5/2024 | Karin ............... G06N 20/00 |
| 2005/0102534 A1 | 5/2005 | Wong |

(Continued)

*Primary Examiner* — Kyung H Shin
(74) *Attorney, Agent, or Firm* — Banner & Witcoff, Ltd.

(57) ABSTRACT

Various aspects of the disclosure relate to enforcing dynamically updated network security policies in real-time (or upon an identified update) from multiple organizations and anonymously analyze computing system configuration information uploaded from third-party computing systems. An analysis engine monitors compliance information and compare the compliance information against the security rules and/or requirements for one or more enterprise networks. A visualization providing a network map with a visual representation of each product system service system may include communication links between internal applications and/or computing systems and drill-down capability to identify issues as they are occurring or are predicted to occur. The security escrow system may include a mechanism to automatically enable/disable access between third party networks and one or more enterprise computing systems in real-time based on identified compliance information.

20 Claims, 5 Drawing Sheets

(56) References Cited

U.S. PATENT DOCUMENTS

| | | |
|---|---|---|
| 2007/0150934 A1 | 6/2007 | Fiszman et al. |
| 2014/0245417 A1 | 8/2014 | Hu et al. |
| 2016/0182567 A1 | 6/2016 | Sood et al. |
| 2018/0309788 A1 | 10/2018 | Johnson et al. |
| 2019/0052664 A1 | 2/2019 | Kibler et al. |
| 2020/0293675 A1* | 9/2020 | Antonatos ............ G06F 21/6218 |
| 2024/0031411 A1* | 1/2024 | Levari ................. H04L 63/1416 |

* cited by examiner

ARTIFICIAL INTELLIGENCE BASED REAL-TIME SECURITY ESCROW SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage access to its computer systems, and particularly manage how internal computer systems securely exchange information with external computer systems in providing and/or supporting different products and services offered by the organization while maintaining defined network security standards. For example, Large business organizations offer multiple products and/or services that utilize API interfaces to provide functional access to large numbers of third-party computing systems. Often, identifying and/or localizing issues as they occur can be difficult to visualize and/or prevent before they occur.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes ensuring third-party computing system's network security policies and measures meet or exceed rules and policies set by one or more enterprise networks. For example, the security escrow system maintains easily identifiable third-party network security compliance for each interconnected computing system across the enterprise network and automatic enabling and disabling of that access based on the identified compliance.

Update in Real-Time and Provide Risk Assessment Visual Indicators Based on Dynamic Pattern Analysis Aspects of the disclosure relate to computer hardware and software. In particular, one or more aspects of the disclosure generally relate to computer hardware and software for automatically enabling and disabling access to computing processes of an enterprise network by third party computing systems by ensuring network security measures of each third-party computing system meet standards and rules of the enterprise computing system.

The third-party security escrow system may dynamically update network security rules/requirements in real-time (or upon an identified update) from multiple organizations and may be anonymously checked against computing system configuration information uploaded from third-party computing systems. An analysis engine that may include a machine learning (ML) and/or artificial intelligence (AI) engine may monitor compliance information and compare the compliance information against the security rules and/or requirements for one or more enterprise networks and may issue a simplified compliance report (e.g., traffic light output of green/yellow/red) to indicated enterprise networks regarding third-party compliance. A visualization providing a network map with a visual representation of each product system service system may also be provided. The visualization may include communication links between internal applications and/or computing systems, where the visualization may include drill-down capability to identify issues as they are occurring (or are predicted to occur). Visual Filters can be used to isolate potential problems (yellow) or critical issues (red) across the network. The security escrow system may provide a mechanism to automatically enable/disable access between third party networks and one or more enterprise computing systems in real-time based on identified compliance information, such as by setting an access flag used within the API interface. In some cases, a third-party computing system may be automatically triggered to update compliance information based on software, hardware, and/or firmware updates.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
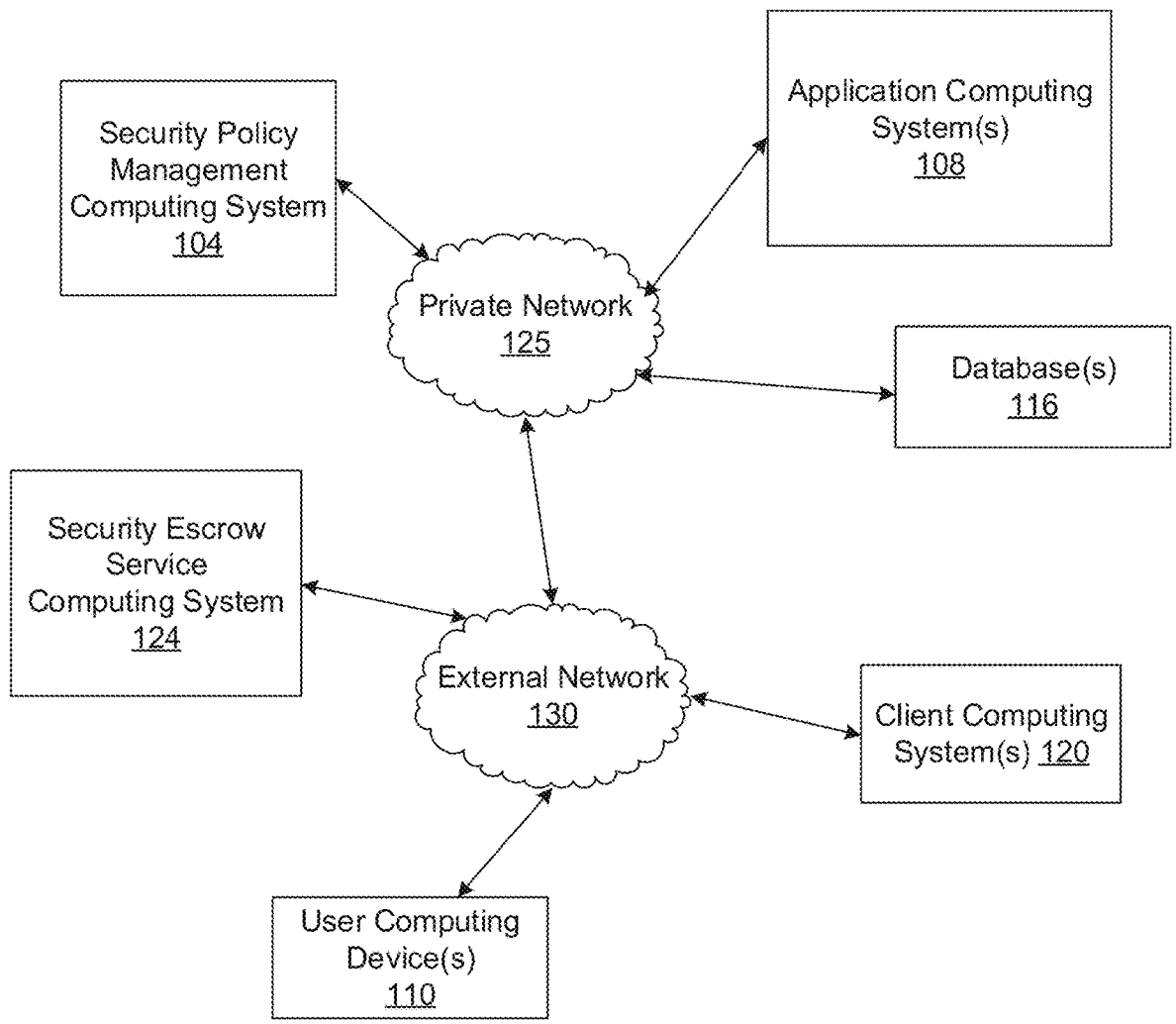
FIG. 1A shows an illustrative computing environment for a security escrow computing system, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

The security escrow computing system may be implemented as a neutral party that would share compliance information with one or more enterprise organizations and indicate noncompliance information to a corresponding organization and/or the 3rd whose security rules may be implicated in that non-compliance. Often, vendors accessing computing services offered by an enterprise organization may access application computing systems on the enterprise network either directly or via application programming interfaces (APIs). Such access may leave the enterprise network open to vulnerabilities and/or attacks since these vendors (or other organizations) may be reluctant to share information about their network security measures with anyone outside their organization. In some cases, the enterprise organizations may at least share non-compliance information and/or potentially certain policy information (e.g., rule sets) with the vendor. The third party security escrow system is configured to act as a middleman between the systems. A need has been recognized for a third-party escrow system configured to manage compliance monitoring of the security policies provided by enterprise organizations. The third party escrow system may monitor compliance of organizations seeking to access information provided by enterprise organizations' application or service computing systems.

Organizations may desire to utilize network security policies to protect their computing networks from malicious actors. Such policies may include a number of aspects including account management policies, clean desk policies, email policies, security incident management policies, log management policies, network security and virtual private network (VPN) acceptable use policies, user device policies (e.g., a bring your own device agreement), password policies, patch management policies, server security policies, systems monitoring and/or auditing policies, vulnerability assessment policies, workstation configuration security policies, telecommuting policies, and/or the like.

For example, an illustrative account management policy may be used to establish a standard for the creation, administration, use, and/or removal of accounts that facilitate access to information and technology resources. An illustrative clean desk policy may be used to ensure that confidential data is not exposed to individuals who may pass through areas at the client sites such as members, service personnel, and malicious actors. The clean desk policy may be used to encourage methodical management of individual workspaces to reduce risk of having data (e.g., confidential information) compromised. An email security policy may be used to establish rules for the use of the organization's email system for sending, receiving, and/or storing of electronic mail. A security incident management policy may define a requirement for reporting and/or responding to incidents related to the organization's information systems and operations. these incident response policies allow for identifying occurrences of security incidents to minimize harm. A log management policy may be used to enhance security, system performance, resource management, and regulatory compliance. A network security and/or VPN acceptable use policy may define standards for connecting to the company's network from any host, either directly to the network or via the VPN over public networks. Such standards minimize potential exposure to damages that may result from unauthorized use of the organization's resources. For example, damages may include loss of sensitive or confidential data, loss of intellectual property, damage to public image, damage to critical company internal systems, and/or the like.

A personal device use policy may define standards, procedures, and/or restrictions for users who may desire to access the organization's data using their personal device. A password policy may establish a standard for the creation of strong passwords, the protection of those passwords, and a frequency of change. A patch management policy may be used to define processes and/or procedures to apply patches to computing system firmware and/or software due to security vulnerabilities that may exist or be leveraged by malicious actors. Such flaws may be used for the development and propagation of malicious software, which can disrupt normal business operations. To mitigate risk, the patch management policy defines processes for use when applying patches to resolve identified bugs and/or security vulnerabilities. A server security policy defines standards and restrictions for a base configuration of internal server equipment owned and/or operated by or on an organizations internal computing network(s) and the like. A systems monitoring and auditing policy may be used to determine if inappropriate actions have occurred within a computing network. For example, system monitoring may identify actions in real time while system auditing identifies the actions after they have occurred. A vulnerability assessment is used to establish standards for performance of periodic vulnerability assessments to identify and implement security controls. A workstation configuration security policy enhances security and quality operating status for workstations and are used when deploying all new workstation equipment. A telecommunication policy defines procedures for users working remotely from an organizational facility and away from a network controlled by the organization.

An information security policy rule set provides strategies to reduce vulnerability, monitor for incidents, and address security threats. The information security policy also outlines procedures to be followed if a security breach or disaster occurs. Further, the information security policy ensures confidentiality, integrity, and availability of data and standardizes processes and rules to help organizations protect against threats to data confidentiality, integrity, and availability. The rule set reduces a risk that security incidents can occur and provides procedures for identifying, assessing, and mitigating security vulnerabilities and risks. Often the security policy provides a summary of an organization's security posture, details protections for network resources, and allows organizations to quickly respond to customer's, partner's, and auditor's requests for this information. The security escrow service computing system, while ensuring compliance to existing rule sets, also identifies gaps in security protocols such as those relative to regulatory requirements, and automatically provides suggested improvements to the rule sets.

The security policy may include a statement of purpose, scope of the ruleset and a timeline of implementation and recovery. Further, the rule set includes a description of authority and information security objectives, compliance requirements and detailed security procedures, processes and controls may also be includes for one or more rule sets including an acceptable usage policy, antivirus management, backup and disaster recovery, change management, cryptography usage, data and asset classification, data retention, data support and operations, data usage, email protection policies, identity and access management, incident response, insider Threat Protection, internet usage restrictions, mobile device policy, network security, password and credential protocols, patch management, personnel security, physical and environmental security, ransomware detection, system update schedule, wireless network and guest access policy. Further the policy may include enforcement and training provisions.

A surge of cybercriminal activity, including an increasing risk for ransomware attacks, show that cybercriminals are constantly developing new techniques to infiltrate or take down vulnerable networks. Due to increasing costs to improve hardware and software-based security measures, enterprise organizations are requiring network security policies and rule sets to be robust. Legitimate third-party access to internal computing resources are also increasing, to allow enterprise organizations to provide products and services to users both internal and external to the organizations. Because the organization can only control implementation of network security policies on their own networks, ensuring reliability and security for the outside computing systems is a risk that cannot be controlled in today's computing environments. To secure the organization's network perimeter defenses, a security policy management computing system may provide a rule set to the security escrow service computing system to provide a framework within which third-party computing networks must adhere to receive access to enterprise computing resources, such as via application programming interface functionality. The security escrow service computing system maintains privacy of each organization's rule set and implementation details and communicates compliance details to both the organization and client computing systems for all aspects of the network including for network firewalls, intrusion prevention systems, advanced threat protection, network access control, web filtering, and security information and event management.

Firewalls monitor incoming and outgoing network traffic and determines whether to allow or block traffic based on a set of predetermined rules. These rules may involve blocking unwanted incoming traffic from specific IP addresses while allowing access to only trusted sources. The firewall rule set includes a list of untrusted IP addresses protect networks from identified threat actors and the security escrow computing system may provide additional addresses to improve operation. Additionally, the rule set may also include a listing of certain domains to configure network security rules which can also be improved over time through operation of the security escrow computing system to further harden network security.

The intrusion protection system actively monitors network traffic to stop potential threats, operating inside the network to inspect network payloads for signs of policy violations, malware attacks, and other abnormal activities. Rule sets may define signature-based detection that leverages the latest threat intelligence databases to recognize cyberattacks and vulnerabilities, which can be improved through suggestions by the security escrow computing system. Additionally, the intrusion protection system may include rules for anomaly-based detection, identify unknown threats. Intrusion protection systems learn the baseline functions and performance levels of a network including metrics like network throughput, latency, and packet loss. Anomaly-based detection compares current network traffic against the pre-established baselines to identify anomalous behaviors. For example, unusually high data upload activity may indicate that cybercriminals are attempting to steal data from your network. When an anomaly or thread signature is identified, the intrusion protection system executes actions to mitigate threats including blocking traffic from a source IP address, dropping any malicious packets, and resetting the connection. Alerts to network administrators are sent to quickly secure any network vulnerabilities. The security escrow computing system may provide improvements over time to improve rule sets based on an analysis of rule sets from all member organizations where identified vulnerabilities in a rule set may be improved based on analysis of anonymized rule sets from other organizations to improve overall network security for all subject computing networks.

Advanced threat protection systems use various techniques to uncover and defend against increasingly sophisticated malware attacks such as by using heuristic and code analysis to examine code on a suspect program or file. For example, if underlying code within a suspect program resembles that of malicious attacks, the advanced threat protection system instantly flags the program as a threat. Additionally, the advanced threat protection systems use sandboxing to launch a suspect file or program in an isolated virtual environment to isolate operation from the network environment. With heuristics and machine learning techniques, the advanced threat protection system examines how the file in question behaves and determine whether it is a threat. If malware has been identified, the advanced threat protection system removes the suspect program and update threat intelligence databases to make detection easier for future investigations. The security escrow computing system may analyze compliance to advanced threat protection rule sets and suggest improvements based on learned operational results anonymously aggregated from enterprise and client system rule sets and compliance information.

Network access control systems use policies and network administration tools to prevent unauthorized users and devices from gaining access to networks. These systems assign accounts to authorized users, which are protected with unique username and password credentials. Users, both human and automated robotic operations, may be categorized based on functionalities and role-based permissions are established. The network access control system may grant limited access privileges to guest users on a separate network to isolate guest actions from company information. The network access control systems may register approved devices with the computing system to identify approved devices for access permissions or to restrict certain devices from performing specified actions or otherwise restrict access. The security escrow computing system may provide improvement to network access control rule sets based on learned rulesets and compliance information of existing rule sets.

A web filter stops messages to and/or from certain websites or URLs and may determine the quality and reputation of a site by referencing up-to-date security intelligence databases and internal policies. As such, web filters reduce a likelihood of inadvertent access to dangerous websites, such as fake app stores and peer-to-peer file sharing sites. The security escrow computing system may learn rule sets associated with web filtering and, during compliance analysis, identify improvements to existing policies.

The security information and event management system provides visibility into the activities within the enterprise network by collecting and aggregating log data generated by the company's unified security framework (e.g., firewalls, IPS, advanced threat protection systems, network access control systems, and the like). The security information and event management system creates a security summary that covers analyses on abnormal network activities as well as incidents such as potential malware attacks. The summaries may be analyzed to identify and address threats by restricting user access, isolating network environments, and blocking malicious payloads. The security information and event management system may improve the rule sets for improving network security and minimize threat exposure by providing granular insights into network traffic and signatures.

FIG. 1A shows an illustrative computing environment 100 for network security management using a security escrow computing system, in accordance with one or more arrangements. The computing environment 100 may comprise one or more devices (e.g., computer systems, communication devices, and the like). The computing environment 100 may comprise, for example, security policy management computing system 104, one or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise one or more third-party computing systems (e.g., client computing systems 120), a security escrow service computing system 124, and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the security escrow service computing system 124 as a separate computing system, security escrow service computing system 124 may be implemented within multiple computing systems.

The security escrow service computing system 124 may comprise one or more computing devices and/or other computer components (e.g., processors, memories, communication interfaces) configured to perform one or more functions as described herein. Further details associated with the architecture of the security escrow service computing system 124 are described with reference to FIG. 1B.

The application computing systems 108 may comprise one or more computing devices and/or other computer components (e.g., processors, memories, communication interfaces). In addition, the application computing systems 108 may be configured to host, execute, and/or otherwise provide one or more enterprise applications. In some cases, the application computing systems 108 may host one or more services configured facilitate operations requested through one or more API calls, such as data retrieval and/or initiating processing of specified functionality, such as via interaction with one or more of the client computing systems 120. In some cases, the client computing systems 120 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. As such, the application computing systems 108 may be subject to one or more rules or policies to ensure network security and/or to meet regulatory requirements. The application computing systems 108 may comprise various servers and/or databases that store and/or otherwise maintain account information, such as financial account information including account balances, transaction history, account owner information, and/or other information. In addition, the application computing systems 108 may process and/or otherwise execute transactions on specific accounts based on commands and/or other information received from other computer systems comprising the computing environment 100. In some cases, one or more of the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where one or more of the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing system 120. In some cases, the client computing systems 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing systems 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by security policy management computing system 104. For example, the database(s) 116 may store network security rules, policies, updates, release notes, and the like. In an arrangement, the database(s) 116 may be used for other purposes as described herein. In some cases, the client computing system 120 may write data or read data to the database(s) 116 via the services.

In one or more arrangements, the security policy management computing system 104, the application computing systems 108, the client computing systems 120, the user devices 110, and/or the other devices/systems in the computing environment 100 may be any type of computing device capable of receiving input via a user interface, and communicating the received input to one or more other computing devices in the computing environment 100. For example, the security policy management computing system 104, the application computing systems 108, the client computing systems 120, the user devices 110, and/or the other devices/systems in the computing environment 100 may, in some instances, be and/or include server computers, desktop computers, laptop computers, tablet computers, smart phones, wearable devices, or the like that may be comprised of one or more processors, memories, communication interfaces, storage devices, and/or other components. Any and/or all of the security policy management computing system 104, the application computing systems 108, the client computing systems 120, the user devices 110, and/or the other devices/systems in the computing environment 100 may, in some instances, be and/or comprise special-purpose computing devices configured to perform specific functions.

Figure 1B:
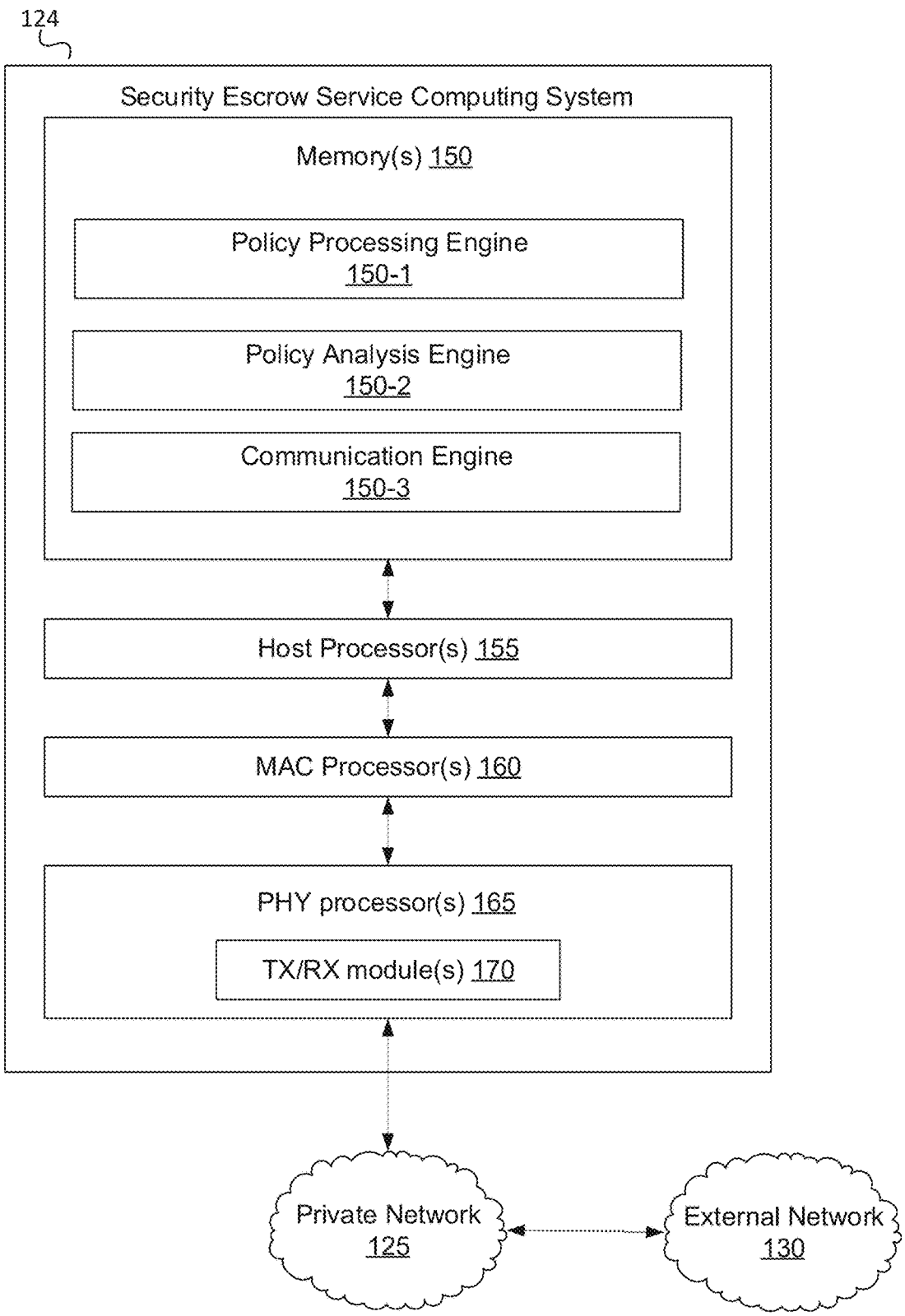
FIG. 1B shows an illustrative computing platform enabled for a security escrow computing system, in accordance with one or more aspects described herein.

FIG. 1B shows an illustrative security escrow service computing system 124 in accordance with one or more examples described herein. The security escrow service computing system 124 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The security escrow service computing system 124 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the security escrow service computing system 124 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the security escrow service computing system 124 may be configured to execute machine readable instructions stored in memory 150. The memory 150 may comprise (i) one or more program modules/engines having instructions that when executed by the one or more processors cause the security escrow service computing system 124 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the security escrow service computing system 124 and/or by different computing devices that may form and/or otherwise make up the security escrow service computing system 124. For example, the memory 150 may have, store, and/or comprise a policy processing engine 150-1, a policy analysis engine 150-2, a communication engine 150-3 and/or the like. The policy processing engine 150-1 may have instructions that direct and/or cause the security escrow service computing system 124 to perform one or more operations associated with processing one or more network security policies and/or rules received from one or more enterprise computing systems, such as from the security policy management computing systems 104, coordinating updates of the one or more network security policies, and the like. The policy analysis engine 150-2 may have instructions that may cause the security escrow service computing system 124 to process and analyze compliance information received from one or more third-party computing systems, such as the client computing systems 120. The communication engine 150-3 may communicate information corresponding to compliance of the third-party computing systems to the network security policies of the one or more enterprise computing systems such as via a user interface screen, communicate suggested improvements to the third-party computing systems to improve compliance to the network security policies, enable communications (e.g., via an API interface) by setting or resetting permissions information (e.g., a communication enablement flag) that allows the client computing systems 120 to communicate via the API function calls when compliance to the enterprise network security policies meets a defined threshold condition.

While FIG. 1A illustrates the security policy management computing system 104, and/or the application computing systems 108, as being separate elements connected in the private network 125, in one or more other arrangements, functions of one or more of the above may be integrated in a single device/network of devices. For example, elements in the security policy management computing system 104 (e.g., host processor(s) 155, memory(s) 150, MAC lprocessor(s) 160, PHY processor(s) 165, TX/RX module(s) 170, and/or one or more program/modules stored in memory(s) 150) may share hardware and software elements with and corresponding to, for example, the application computing systems 108.

Figure 2:
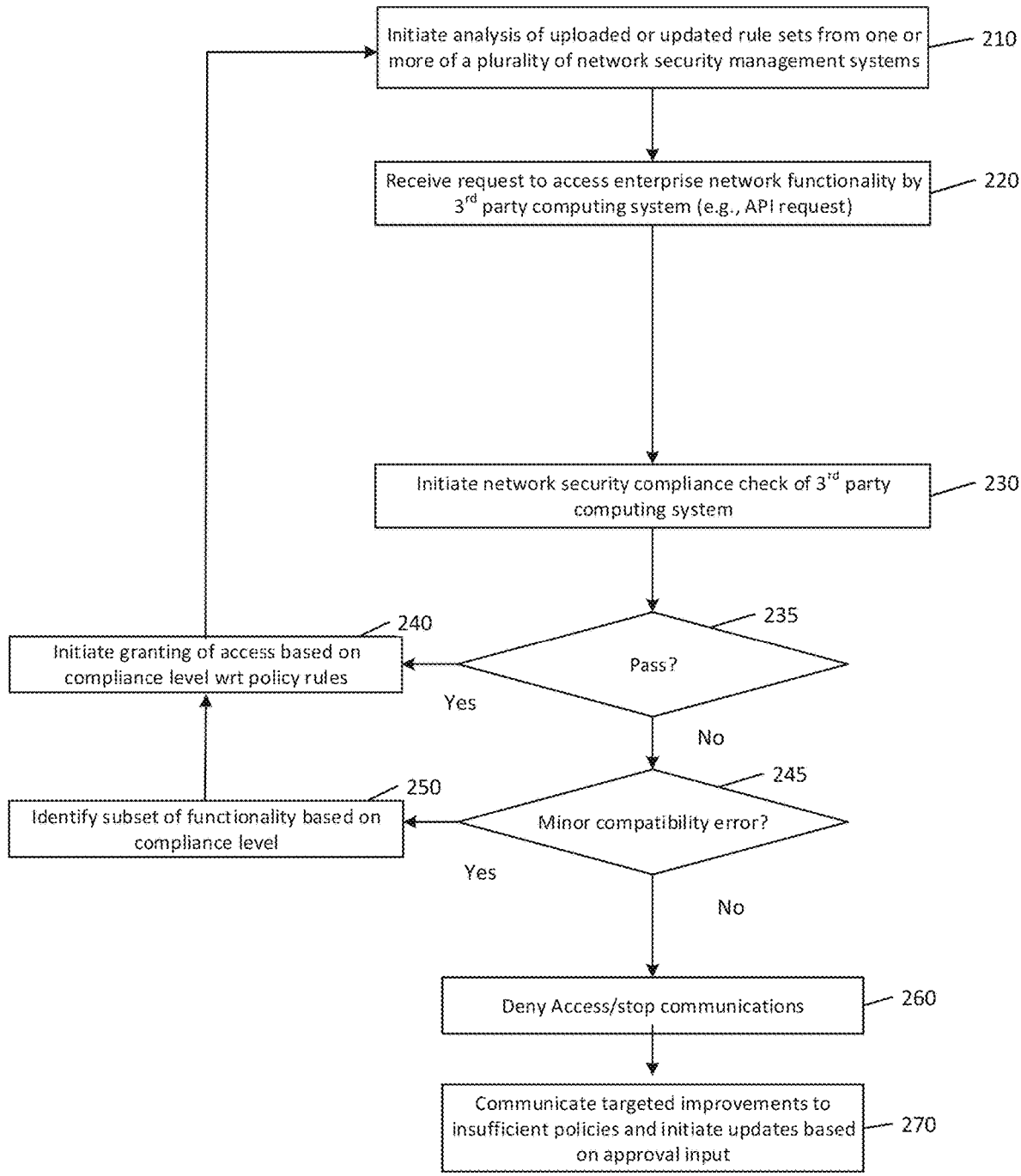
FIG. 2 shows an illustrative process for use by a security escrow computing system in accordance with one or more aspects described herein.

FIG. 2 shows an illustrative process for use by a security escrow computing system in accordance with one or more aspects described herein. At 210, the security escrow service computing system 124 may initiate analysis of uploaded or updated rule sets from one or more of a plurality of network security management systems of the enterprise computing networks. At 220, the security escrow service computing system 124 may receive a request to access functionality provided by one or more application computing systems of at least one of the enterprise computing systems by a third-party computing system, such as by using an API request. At 230, the security escrow service computing system 124 may initiate a compliance check of the third-party computing system, such as by comparing network security policy and/or implementation information received from the third-party computing system to one or more enterprise network security policies. If, at 235, the third-party computing system meets the requirements set by the enterprise organization, the security escrow service computing system 124 may initiate granting of access based on a compliance level with respect to network security policy rules at 240. For example, different compliance levels may be set for different application computing systems, such as by setting stricter policy requirements for application computing systems dealing with private or otherwise non-public information.

If, at 235, the third-party computing system's network security measures fail to meet all requirements of the enterprise network security policy, then at 245, the security escrow service computing system 124 may identify whether the non-compliance is a minor compatibility difference with the enterprise network security policy or a major compatibility difference and may communicate a status user interface identifying a level of compatibility. If so, then the security escrow service computing system 124 may identify a subset of functionality based on a level of compliance identified between the third-party network security compliance to the enterprise network security policy at 250, and the system may then grant access to the subset of functionality at 240. If, at 245, the network security measures of the third-party computing system fails to meet the requirement of the enterprise network security policy and the failure is not a minor compatibility error, then the security escrow service computing system 124 may deny new communications and stop current communications between the two computing networks. at 260. At 270, the security escrow service computing system 124 may communicate to the third-party computing system suggested targeted improvements to insufficient policies and initiate updates based on approval input.

Figure 3:
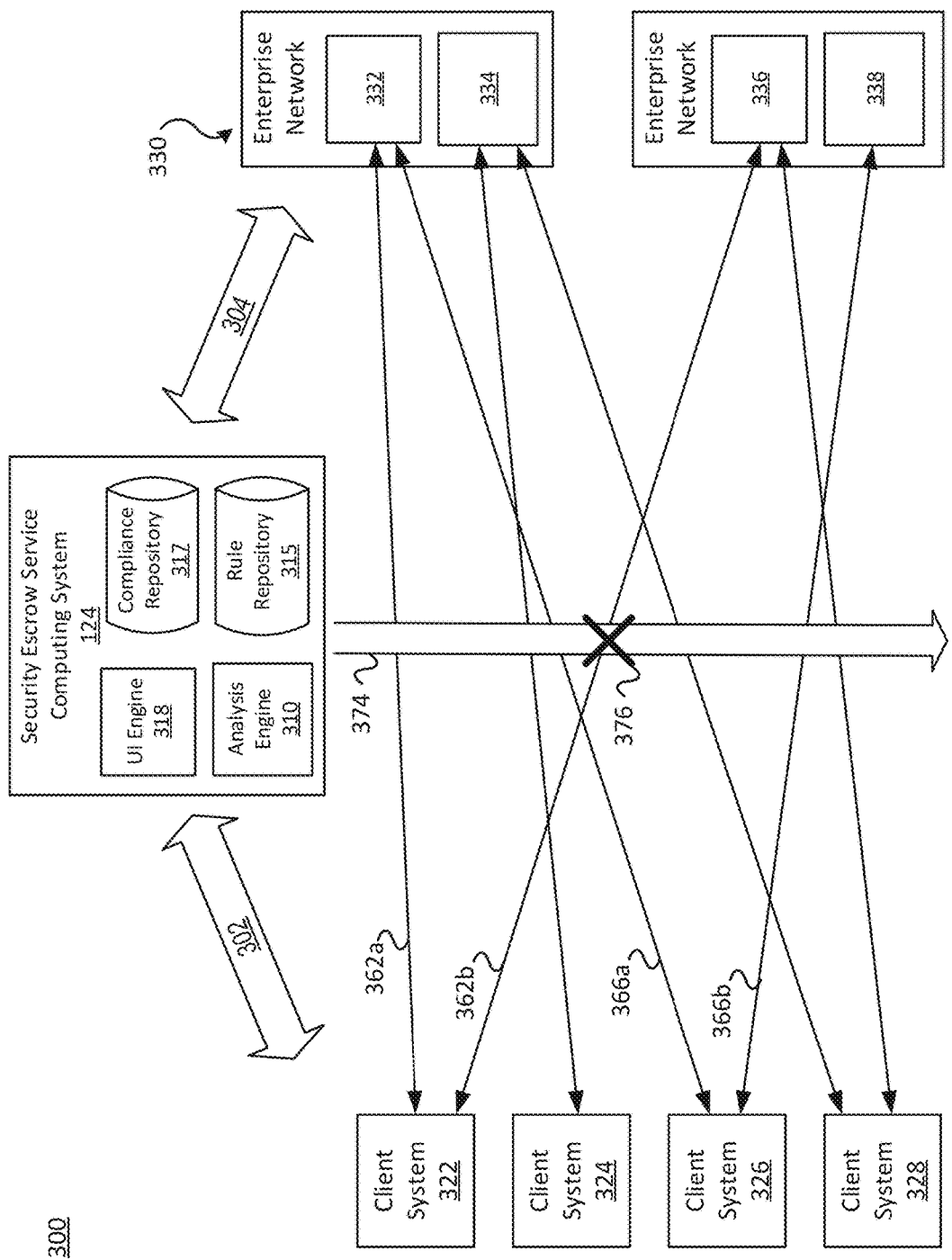
FIG. 3 show an illustrative security escrow computing system, in accordance with one or more aspects described herein.

FIG. 3 show an illustrative security escrow computing environment 300, in accordance with one or more aspects described herein. The security escrow computing environment 300 may include the security escrow service computing system 124, a plurality of enterprise computing systems 330 communicating network security policies to the security escrow computing environment 300 via a communication interface 304. The enterprise computing systems 330 may include one or more application computing systems 332, 334, 336, and 338 configured to provide computing functionality to third party computing systems via an application programming interface. The client computing systems 322, 324, 326, and 328 of the security escrow computing environment 300 may access information provided by the application computing systems 332, 334, 336, and/or 338 when the security escrow service computing system 124 determines whether their security measures meet the standards of the enterprise network security policies. The client computing systems 322, 324, 326, and 328 may exchange network security information and/or compliance information with the security escrow service computing system 124 via a communication interface 302.

The security escrow service computing system 124 may include an analysis engine 310, one or more data repositories, such as the rule repository 315 and the compliance repository 317, and a user interface engine 318. The analysis engine may include a machine learning engine that may train a network security policy compliance model to identify whether client computing system network security measures meet standards set by one or more enterprise organizations for their computing networks. In some cases, the model may be trained on historic training data provided by one or more enterprise network computing systems and/or by the security escrow service computing system 124 based on certain network security standards. The rule repository may store network security policy information received from each enterprise network 330 via a communication interface 304. The compliance repository 317 may store compliance information received from each client computing system 322, 324, 326, and 328. The user interface engine may generate user interface screens, such as those shown in FIGS. 4A-4D and showing a level of compliance between security measures implemented by the client computing systems 322, 324, 326, and 328 and individual ones of the enterprise network security policies. In some cases, the analysis engine 310 may provide suggestions to improve the client system compliance with individual enterprise network security policies, and/or improvements to the enterprise network security policies. The security escrow service computing system 124 may enable or disable communications between various client systems and application computing systems 108 via a mechanism 374. For example, when the analysis engine 310 determines that a client computing system meets the requirements defined by the one or more enterprise network security policies, the security escrow service computing system 124 may enable the mechanism 374 to enable communicate between the client computing system and the associated application computing system. As shown in FIG. 3, client computing system 322 desires to access data from application computing system 332 and 336 from different enterprise organizations. Client system 326 desires to access information from application computing system 332 and 338. Here, the client system 326 has been determined to be compliant with the network security policies of each of the enterprise networks 330 and may access data, for example, via API function calls 366a and 366b. Client computing system 322 is compliant with the network security policy associated with application computing system 332, but now with application computing system 336. As such, the client system 322 has the API communication 362a enabled, but the API communications 362B has been disabled via the mechanism 376.

Figure 4A:
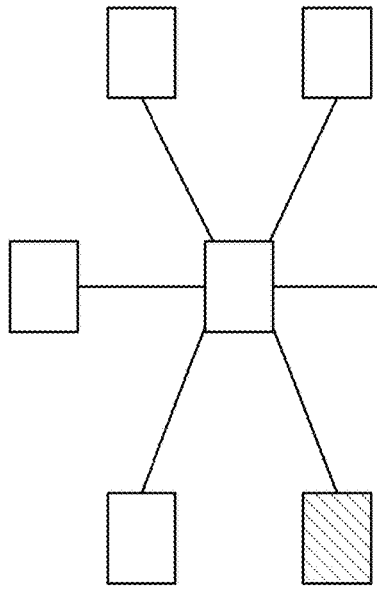
FIGS. 4A-4D show illustrative examples of user interfaces generated by the security escrow computing system in accordance with one or more aspects described herein.
Figure 4B:
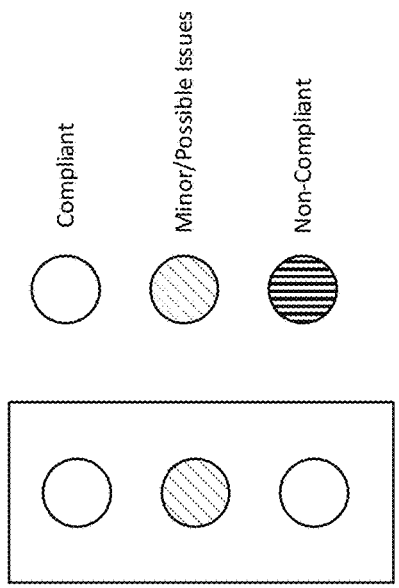
Figure 4C:
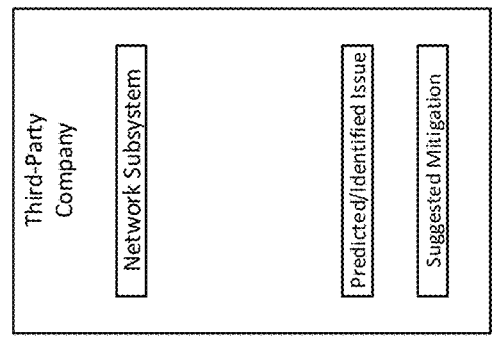
Figure 4D:
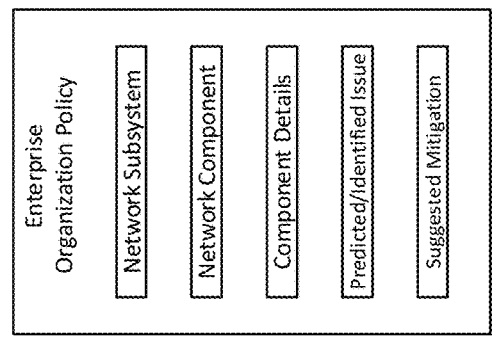

FIGS. 4A-4D show illustrative examples of user interfaces generated by the security escrow computing system in accordance with one or more aspects described herein. FIG. 4A shows a simplified interface generated by the user interface engine 318 to show whether the client computing network is compliant, has minor issues (or possible minor issues), or is non-compliant. Here, the user interface indicates that the client computing system has minor or possible errors. In some cases, the user interface provided to the client computing system for viewing may include drill-down functionality to allow the user to view additional visual representations of the compliance problems. For example, FIG. 4B shows a network map with a component being identified as having minor or possible errors. For example, a server may have been identified as having a different firmware revision level than has been defined in the policy, but that the firmware version as installed is not indicated as having a known network security vulnerability. FIG. 4C shows another user interface screen provided to the client computing system with user selectable buttons to show additional information for network subsystems, network components, network component details, additional information concerning predicted and/or identified issues with the compliance information and, optionally, suggested mitigation measures. In some cases, the machine learning engine may automatically generate the suggested mitigation measures based on learned compatibility information aggregated from a plurality of enterprise organization network security policies, release notes for software, firmware, hardware components, identified network vulnerabilities that have and have not been resolved, and the like. FIG. 4D shows a user interface screen providing additional information to a device on the enterprise network. Because the third-party network security policies and implementations are hidden from viewing of the enterprise network, the additional information provided to the enterprise organization is a subset, and/or differs from the information provided to the third-party network.

In an illustrative example, multiple businesses (e.g., vendors, service providers, and the like) may desire access to some computing systems owned by one or more of a consortium of enterprise organizations (e.g., financial institutions). A centralized repository may be desired to grant access to outside computing systems to systems and/or services provided via a consortium member's computing network. Those outside computing systems may upload evidence and/or artifacts for compliance checks against each of the financial institution's uploaded network security policy. In such cases, none of the outside organizations (e.g., vendors, suppliers, and the like) can view each other's compliance information or evidence. Similarly, the enterprise organizations cannot view each other's policies. However, if a first enterprise organization identifies an outside organization (e.g. vendor A) as vendor of theirs, then that enterprise organizations can see policy compliance information associated with vendor A. However, the specific details will remain hidden. For example, the result may return an indication of compliant or non-compliant for individual rules and/or for the policy as a whole.

If the enterprise organizations deems it beneficial to share the policy with the vendor or vendor, the enterprise organization can enable release, by the security escrow system to release aspects of the relevant policy information or the entire policy information, to be viewed by one or more of their partnered outside organizations. In some cases, the vendor could see that they're in compliance or noncompliance with one or more policies, such as in a binary manner (e.g., compliant or non-compliant. In some cases, the vendor may be presented with a visual indication, such as a "traffic light" indicator, showing compliance (e.g., green), partially compliant (e.g., yellow), or non-compliant (e.g., red). In some cases, compliance may be shared as a network map, results of static analysis or security testing, and/or the like. For example, analysis of compliance for web applications may take the form of static or dynamic analysis. In some cases, penetration test results may be taken using an automated testing tool. In some cases, network configurations may be tested using an automated network tool. In some cases, human generated input may be analyzed using a machine learning engine to parse the human generated information and compare that against the policy information.

Because policy compliance information may be provided in different evidence and artifacts, as defined by the policies, the security escrow system may analyze policies and based on the policies, request certain information from the outside organizations seeking to access network information associated with the policies. In some cases, the security escrow service may provide a "Rosetta store" that may be a structure configured for each vendor and/or enterprise organization to customize based on their compliance input, where a corresponding structure may be provided for each enterprise organization for entry of the policy information and overall framework of their security policies.

In some cases, organizations may perform a cyber-security assessment of their security policies, such as an in-depth analysis from endpoint level, to network level, to process level, to personnel level. In some cases, this information may be leveraged to provide compliance information in a common format, such as one used by underwriters to that provide cybersecurity insurance. While such reports assess each aspect of an organization's security policies, the reporting analysis may only be performed once per year. However, because of this, each vendor network may include automated and/or manual analysis infrastructure implemented within each organization's network to perform security assessments of network computing components.

The security escrow system may analyze compliance information associated with third-party computing systems seeking access to one or more enterprise network-enabled products and/or services. The security escrow system may store system-level, database-level, application-level vulnerability information associated with network security policies. The security escrow system may maintain policies to ensure that the policies are up to date and that complying systems do not include any critical vulnerabilities. The security escrow service computing system may identify policies and/or learn evidence required to be shown to meet those policies as software, hardware, and/or firmware changes on each associated computing network over time to proactively manage compliance information and/or access to the enterprise organizations' network. In some cases, the security escrow service computing system may identify, based on a client system network landscape, risk for vulnerabilities and may provide incentive to reduce the vulnerability risk. Such incentives may include extended access to certain data, discounts and/or other such measures. If a client system has a consistent record of poor management and/or implementation of network security measures, the security escrow service computing system may suggest to the enterprise organization that they discontinue the client organization's permission to access the enterprise organization's network resources. If, a client organization shows a consistent or increasing adherence to successful network security policies, the security escrow service computing system may provide certain rewards from the enterprise organization.

In some cases, the security escrow service computing system may receive policy information from the enterprise network, along with certain parameters, certain security features that are desired to be monitored as part of ensuring compliance to the policies. For example, the security escrow service computing system may provide live monitoring in real-time or near real time. In some cases, the security escrow service computing system may provide periodic (e.g., daily, weekly, biweekly, monthly) monitoring, or a combination of periodic monitoring, on-demand monitoring, change detection monitoring, and/or real-time monitoring.

In some cases, the security escrow service computing system may provide an enterprise organization with trending information corresponding to network security actions performed by their vendors. For example, whether the security policies of the vendor computing systems have been updated over time, improved or worsened their compliance to certain rule sets on an ongoing basis, rather than waiting for a yearly audit. For example, the security escrow computing system may identify and/or communicate information regarding certain network infrastructure, such as firewall security and network intrusion monitoring processes and implementations. In some cases, the machine learning model may identify deviations and/or policy exceptions and may visually represent those on a network map. In some cases, a dashboard may be provided to display network security status information and/or policy compliance information, such as for servers, applications, databases, firewalls, and the like. In doing so, the security escrow service computing system may identify holes in security policies and/or rule sets. In some cases, the security escrow service computing system may identify orphan rules within the rule set and may identify certain rules that may be removed from the rule set and/or reconfigured based on the current network infrastructures.

In some cases, the security escrow service computing system may define compliance information to be provided by the client computing systems to demonstrate compliance to the rules in the security policies, such as by providing a timestamp of patches applied to endpoints, dates and times of data logs from mandated packages, configuration information for security processes, evidence of automated patching processes, and/or the like.

In some cases, network security rule sets may be provided as a high-level policy, where a machine learning model may be continually trained from policies, rule sets, and compliance information from multiple sources (e.g., multiple enterprise organization security policies) to provide suggestions for improvements based on feedback identified from compliance information. In some cases, the machine learning model may output predictions on whether a rule set may need to be improved based on identified risks of malicious actors breaching network security measures. For example, a client computing system may analyze large amounts of data that may include SQL injections and/or cross scripting, where a large code base may be analyzed. The machine learning model may identify risks associated with code base source code and may predict whether an error may be introduced that may put the network at risk of a breach.

In some cases, a machine learning model may identify firewall orphan rules that no traffic has passed through for a year, which may result in a prediction of poor coding practices that may further identify risks associated with that vendor. In some cases, the security escrow service computing systems may include multiple models to analyze different aspects of a network security policy, such as a model for firewall rule sets, a model for database rule sets, a model for authentication rule sets, and the like.

In some cases, vendors providing computing services to the enterprise organization may utilize the agile way of development. To monitor their systems, such as by tracking changes and updates, may provide insights into a potential for security vulnerabilities and the machine learning model may output mitigation plans to mitigate vulnerabilities as they are identified. For example, third-party vendors are constantly updating, so if a vulnerability arrives, the enterprise organization may not have identified the risk, as such, the security escrow service computing system may identify new vulnerability information based on compliance information received from one or more vendor computing systems to improve the speed of mitigation of vulnerability risks as they are identified. In some cases, the security escrow service computing system may track mitigation speed vulnerabilities identified on the client computing systems. For example, if a vendor is taking longer than expected to fix high severity risks, this shows evidence of poor governance practices in terms of their vulnerability management program.

The security escrow service computing system may include a reporting mechanism that compares inherent risk and residual risk for each vendor computing system to predict a likelihood that an associated client computing system may be experience a vulnerability. This prediction may be communicated to the appropriate enterprise organization along with a score associated with the client computing systems compliance with the network security rule set over time and a trend of whether compliance is increasing or decreasing.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a first computing network comprising a first application computing platform exchanging data with a second application computing platform via an application programming interface (API), wherein the first computing network performs operations based on first network security policy information;
a second computing network comprising the second application computing platform, wherein the API controls data exchange to and from the second application computing platform;
a security escrow computing system comprising:
a processor; and
memory storing computer-readable instructions that, when executed by the processor, cause the security escrow computing system to:
train, based on historic network security data logs, a machine learning model, wherein the machine learning model corresponds to one or more network security rule sets;
receive, from the second computing network, second network security policy information associated with the second computing network;
analyze, based on analysis of the second network security policy information via the machine learning model, the first network security policy information to identify a level of compliance complies with the second network security policy information; and
set, automatically and based on a first level of compliance, a flag indicating whether the first application computing platform is allowed to access data from the second application computing platform via the API, wherein API function calls are enabled or disabled, wherein data exchange between the first application computing platform and the second application computing platform is enabled or disabled based on the flag.

2. The system of claim 1, wherein the instructions further cause the security escrow computing system to generate a first user interface screen comprising compliance information identifying one of a compliance indication, a partial compliance indication, and a non-compliance indication.

3. The system of claim 1, wherein enabling the flag enables data exchange via the API when a first level of compliance indicates that the first network security policy complies with the second network security policy.

4. The system of claim 1, wherein disabling the flag disables data exchange via the API when a first level of compliance indicates that the first network security policy fails to comply with the second network security policy.

5. The system of claim 1, wherein the instructions cause the security escrow computing platform to continually retrain the machine learning model based on updates to one or both of the first network security policy and the second network security policy.

6. The system of claim 5, wherein system further comprises a third computing network comprising a third network security policy, wherein the instructions cause the security escrow computing system to:
  train, continually, the machine learning model based on data sets associated with the third computing network and compliance information between the first network security policy and the third network computing policy.

7. The system of claim 6, wherein the instructions further cause the security escrow computing system to facilitate, based on a level of compliance between the first network security policy and the third network security policy, use of second API functions between the first application computing system and a third application computing system associated with the third computing network.

8. The system of claim 1, wherein the machine learning model comprises a plurality of machine learning models, each machine learning model of the plurality of machine learning models corresponding to a component of a network security policy, wherein aspects of the network security policies comprise user authentication, network access control and firewalls.

9. A method comprising:
  receiving, from a first computing network, first network security policy information associated with the first computing network;
  receiving, from a second computing network, second network security policy information associated with the second computing network, wherein data exchange via one or more application computing platforms of the second computing network are facilitated via an application programming interface (API);
  training, based on historic network security data logs, a machine learning model, wherein the machine learning model corresponds to one or more network security rule sets;
  determining, by a security escrow computing system based on analysis of the second network security policy information, whether the first network security policy information complies with the second network security policy information;
  setting, by the security escrow computing system based on a first level of compliance, a flag indicating whether a first application computing platform associated with the first computing network is allowed to access data, via the API, from a second application computing platform associated with the second computing network; and
  enabling, by the security escrow computing system via a flag indicating compliance between the first network security policy information and the second network security policy information, data exchange between the first application computing platform and the second application computing platform.

10. The method of claim 9, further comprising generating a first user interface screen comprising compliance information identifying one of a compliance indication, a partial compliance indication, and a non-compliance indication.

11. The method of claim 9, wherein enabling the flag enables data exchange via the API when a first level of compliance indicates that the first network security policy complies with the second network security policy.

12. The method of claim 9, wherein disabling the flag disables data exchange via the API when a first level of compliance indicates that the first network security policy fails to comply with the second network security policy.

13. The method of claim 9, further causing continually retraining of the machine learning model based on updates to one or both of the first network security policy and the second network security policy.

14. The method of claim 13, further comprising training, continually, the machine learning model based on data sets associated with a third computing network and compliance information between the first network security policy and a third network computing policy, wherein the third computing network complies with the third network security policy.

15. The method of claim 14, further comprising facilitating, based on a level of compliance between the first network security policy and the third network security policy, use of second API functions between the first application computing system and a third application computing system associated with the third computing network.

16. The method of claim 9, wherein the machine learning model comprises a plurality of machine learning models, each machine learning model of the plurality of machine learning models corresponding to a component of a network security policy, wherein aspects of the network security policies comprise user authentication, network access control and firewalls.

17. Non-transitory computer readable media storing instructions that, when executed by a processor, cause a security escrow computing system to:
  receive, from a first computing network, first network security policy information associated with the first computing network;
  receive, from a second computing network, second network security policy information associated with the second computing network, wherein data exchange via one or more application computing platforms of the second computing network are facilitated via an application programming interface (API);
  train, based on historic network security data logs, a machine learning model, wherein the machine learning model corresponds to one or more network security rule sets;
  determine, based on analysis of the second network security policy information, whether the first network security policy information complies with the second network security policy information;
  set, based on a first level of compliance, a flag indicating whether a first application computing platform associated with the first computing network is allowed to access data, via the API, from a second application computing platform associated with the second computing network; and
  enable, via a flag indicating compliance between the first network security policy information and the second network security policy information, data exchange between the first application computing platform and the second application computing platform.

18. The non-transitory computer readable media of claim 17, wherein the instructions further cause the security escrow computing system to continually retrain the machine learning model based on updates to one or both of the first network security policy and the second network security policy.

19. The non-transitory computer readable media of claim 18 wherein the instructions further cause the security escrow computing system to train, continually, the machine learning model based on data sets associated with a third computing network and compliance information between the first network security policy and a third network computing policy, wherein the third computing network complies with the third network security policy.

20. The non-transitory computer readable media of claim 19 wherein the instructions further cause the security escrow computing system to facilitate, based on a level of compliance between the first network security policy and the third network security policy, use of second API functions between the first application computing system and a third application computing system associated with the third computing network.

* * * * *